United States Patent
Baumgartner et al.

(10) Patent No.: US 9,376,857 B1
(45) Date of Patent: Jun. 28, 2016

(54) VENT COVER SYSTEM

(71) Applicants: Paul Baumgartner, Port St. Lucie, FL (US); Jonathan J. Ricciardi, West Richland, WA (US)

(72) Inventors: Paul Baumgartner, Port St. Lucie, FL (US); Jonathan J. Ricciardi, West Richland, WA (US)

( * ) Notice: Subject to any disclaimer, the term of this patent is extended or adjusted under 35 U.S.C. 154(b) by 0 days.

(21) Appl. No.: 14/872,190

(22) Filed: Oct. 1, 2015

(51) Int. Cl.
| | | |
|---|---|---|
| *E06B 7/18* | (2006.01) | |
| *E06B 7/02* | (2006.01) | |
| *F16M 11/24* | (2006.01) | |
| *F16M 11/28* | (2006.01) | |
| *F16M 11/26* | (2006.01) | |

(52) U.S. Cl.
CPC .............. *E06B 7/02* (2013.01); *F16M 11/24* (2013.01); *F16M 11/242* (2013.01); *F16M 11/26* (2013.01); *F16M 11/28* (2013.01)

(58) Field of Classification Search
CPC .......... E06B 7/02; F16M 11/28; F16M 11/26; F16M 11/24; F16M 11/242
USPC ................................... 49/463, 466
See application file for complete search history.

(56) References Cited

U.S. PATENT DOCUMENTS

| | | | | | |
|---|---|---|---|---|---|
| 4,913,127 | A | * | 4/1990 | Dugger ..................... | 126/299 R |
| 4,978,984 | A | * | 12/1990 | Brookfield .................... | 396/427 |
| 5,165,189 | A | * | 11/1992 | Besal .............. | 49/463 |
| 7,185,868 | B2 | * | 3/2007 | Wang ........................... | 248/422 |
| 8,001,909 | B2 | * | 8/2011 | Overgaard et al. ............ | 108/147 |
| 8,196,604 | B1 | * | 6/2012 | Ricciardi et al. ......... | 137/601.11 |
| 8,359,984 | B1 | | 1/2013 | Wolf, II et al. | |
| 2007/0053789 | A1 | * | 3/2007 | Ricciardi et al. ................ | 422/28 |
| 2008/0115418 | A1 | * | 5/2008 | Duffy .............................. | 49/466 |
| 2008/0178779 | A1 | * | 7/2008 | Agee ............................. | 108/147 |
| 2011/0146162 | A1 | * | 6/2011 | Kilhams ......................... | 49/463 |

* cited by examiner

*Primary Examiner* — Jerry Redman
(74) *Attorney, Agent, or Firm* — Donald J. Ersler

(57) ABSTRACT

A vent cover system preferably includes a portable automated vent cover and a vacuum release door. The portable automated vent cover includes a drive system, a telescoping tube, a vent cover door and a collapsible mobile tripod. A vacuum break opening is formed through a middle of the vent cover door. The vacuum release door preferably includes a vacuum door plate, a plurality of retention pins, a sealing gasket and a tube flange. A plurality of pin holes are formed around a perimeter of the vacuum door plate to receive the plurality of retention pins. The plurality of retention pin are inserted through the plurality of pin holes and attached to the vent cover door. The tube flange includes an opening, which is sized to snugly receive an inner cover tube of the telescoping tube and is attached to a bottom of the vacuum door plate.

20 Claims, 10 Drawing Sheets

VENT COVER SYSTEM

BACKGROUND OF THE INVENTION

1. Field of the Invention

The present invention relates generally to disinfecting a hospital room and more specifically to a vent cover system, which allows a vent cover door to be withdrawn from covering a vent without an operator having to pry the vent cover door off the vent.

2. Discussion of the Prior Art

A vent cover is placed over a heating/cooling vent when a hospital room is disinfected. Automation of the vent covering process speeds up the disinfection process. U.S. Pat. No. 8,359,984 ('984 patent) to Wolf II et al. discloses a portable automated vent cover. U.S. Pat. No. 8,359,984 is herein incorporated into this patent application by reference in its entirety. However, the vent cover door of the '984 patent does not always release from a vent opening without manual intervention on the part of an operator, because the vacuum in the vent retains the vent cover door against the vent opening. Further, it is advantageous to bypass air flow through a room by connecting an entry vent to an exit vent, when the entry and exit vents are covered.

Accordingly, there is a clearly felt need in the art for a vent cover system, which allows a vent cover door to be withdrawn from a vent opening without an operator having to pry the vent cover door off the vent.

SUMMARY OF THE INVENTION

The present invention provides a vent cover system, which allows a vent cover door to be withdrawn from a vent opening without operator intervention. The vent cover system preferably includes a portable automated vent cover and the vacuum release door. The portable automated vent cover includes a drive system, a telescoping tube, a vent cover door and a collapsible mobile tripod. The telescoping tube includes an outer support tube and an inner cover tube that slides within the outer support tube. A bottom of the outer support tube is attached to the collapsible mobile tripod. The drive system is retained at a top of the outer support tube. The drive system moves the inner cover tube along a vertical axis. However, the drive system may be replaced with a manual lift system to provide a portable manually operated vent cover.

The vacuum release door preferably includes a vacuum door plate, a plurality of retention pins, a sealing gasket and a tube flange. The sealing gasket includes the same outer perimeter as the vacuum door plate. A vacuum break opening is formed through a center of the vent cover door. The vacuum break opening can be any suitable size and the vacuum release door may drop any suitable distance. The sealing gasket is preferably attached to a top of the vacuum door plate. A plurality of pin holes are formed around a perimeter of the vacuum door plate to slidably receive the plurality of retention pins. Each retention pin includes a head portion and a pin portion. The pin portion extends from the head portion. The pin portion is inserted through the plurality of pin holes and attached to the vent cover door with fasteners or the like. The tube flange includes a tube opening, which is sized to snugly receive a top end of the inner cover tube. The tube flange is attached to a bottom of the vacuum door plate.

A vent bypass system is created by forming a bypass hole through a vent cover door of two adjacent vent cover doors. A tube flange is extended from a bottom surface of the vent cover door, concentric with the bypass hole. A first vent cover door covers an entry vent and the second vent cover door covers an exit vent. One end of a flexible tube is secured to one of the two tube flanges and the other end of the flexible tube is secured to the other one of the two tube flanges. Air blown into the room will bypass circulating through the room by going through the flexible tube from the entry vent to the exit vent. Any suitable means to connect the various vents can be used, such as, but not limited to any pipe, hose, tube, conduit, or the like. The vent bypass system will also keep a balance in a circulating system by not sealing up a normal flow pattern through the room.

In use, the vent cover door is raised, until a peripheral sealing ring on a top of the vent cover door seals around a perimeter of a vent opening. When an attempt is made to lower the vent cover door from the vent opening, the inner cover tube will first cause a seal to be broken between the vacuum door plate and the vent cover door. After the seal is broken, the plurality of retention pins will experience a downward force, which will cause a seal between the vent cover door and the vent opening to be broken. The vent cover system makes it easier to break a seal between the vent opening and the vent cover door, because the perimeter of the vacuum release door is much smaller than a perimeter of the vent cover door. Consequently, it is easier to break a small length seal than a larger length seal.

Accordingly, it is an object of the present invention to provide a vent cover system, which allows a vent cover door to be withdrawn from a vent opening without an operator having to pry the vent cover door off the vent.

These and additional objects, advantages, features and benefits of the present invention will become apparent from the following specification.

DETAILED DESCRIPTION OF THE PREFERRED EMBODIMENTS

Figure 6:
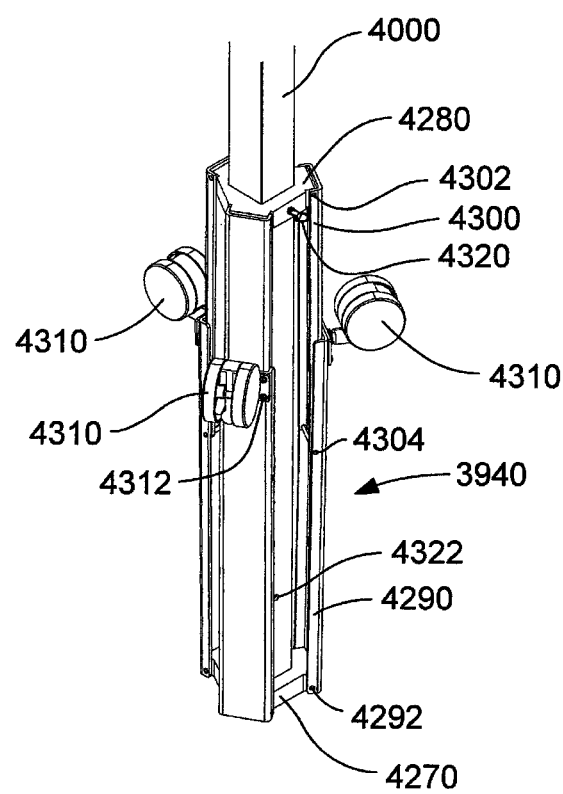
FIG. 6 is an enlarged perspective view of a mobile tripod of a portable automated vent cover in a collapsed orientation.
Figure 7:
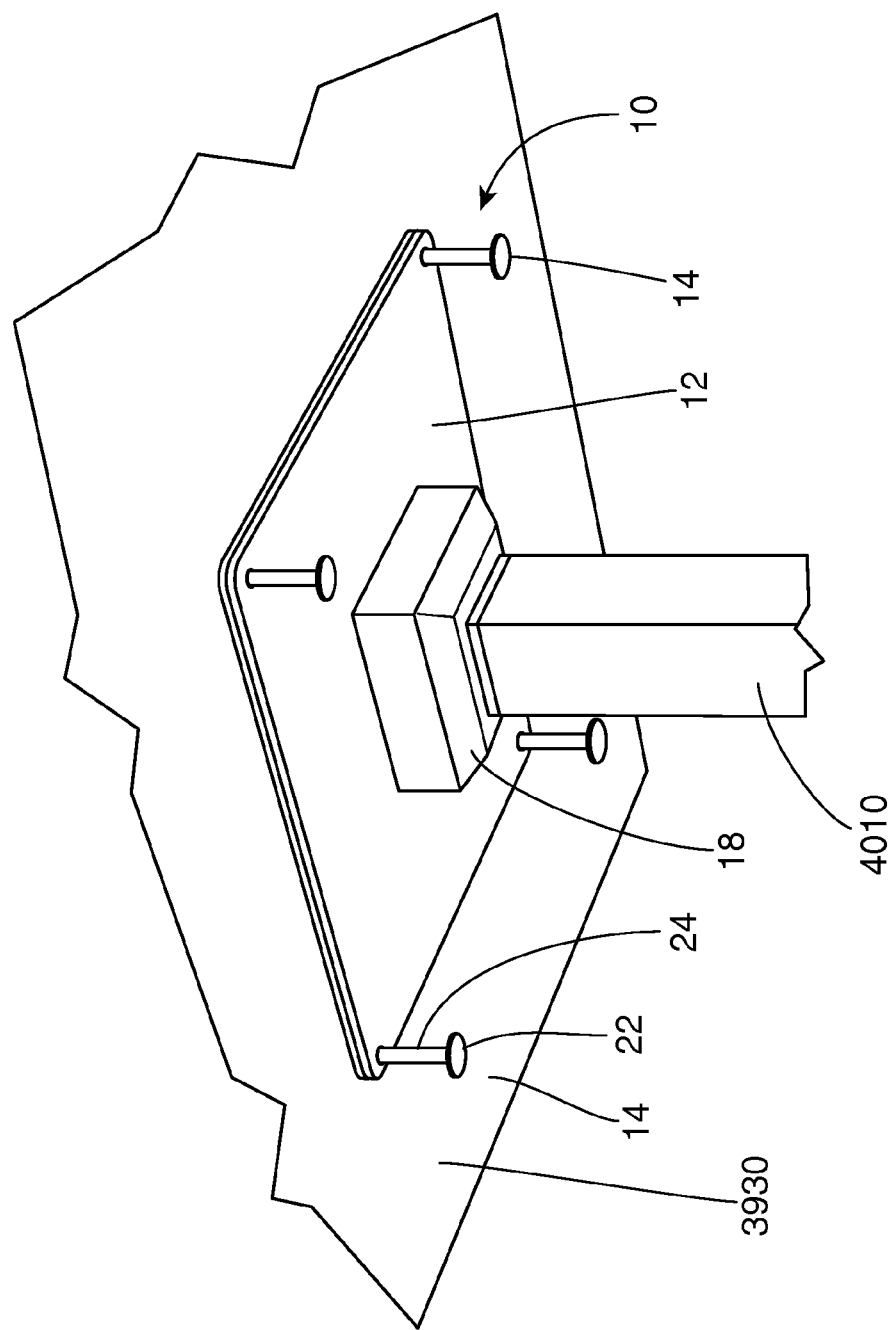
FIG. 7 is a bottom perspective view of a vacuum release door in contact with a vent cover door of a vent cover system in accordance with the present invention.
Figure 10:
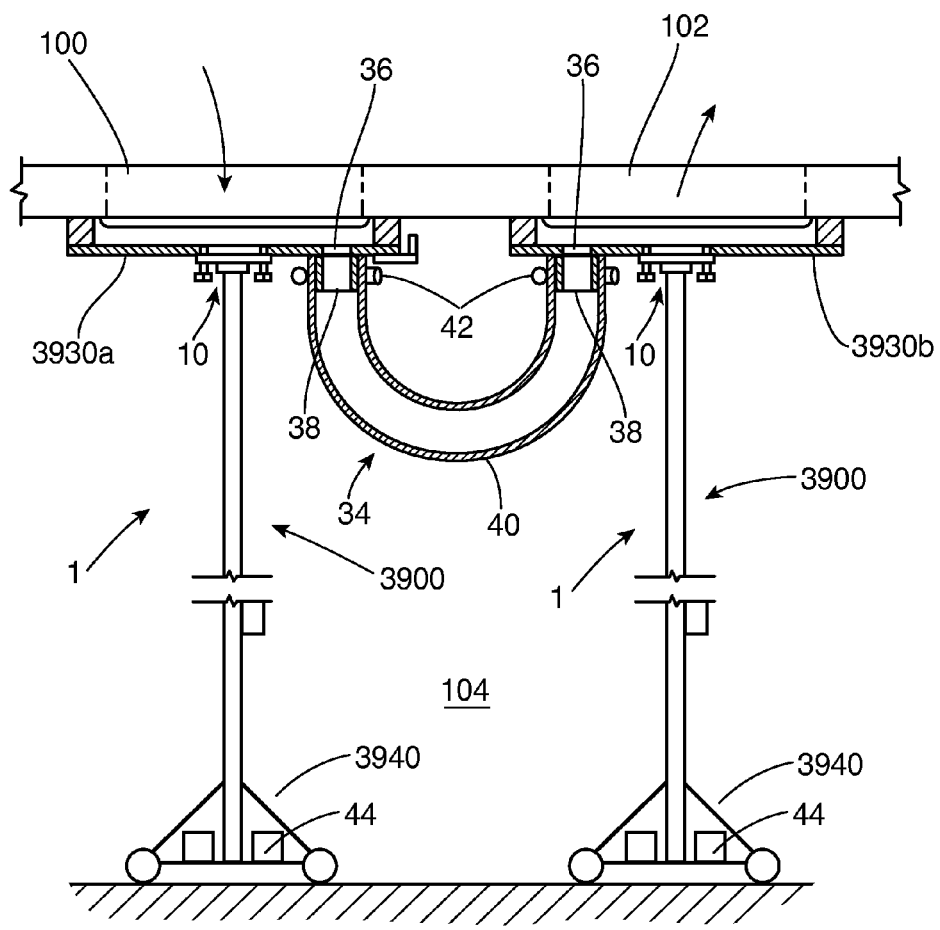
FIG. 10 is a side partially cross sectional view of a first vent cover system adjacent to a second vent cover system connected to each other with a bypass vent system in accordance with the present invention.

With reference now to the drawings, and particularly to FIG. 7, there is shown a perspective view of a vacuum release door 10 in contact with a bottom of a vent cover door 3930 of a portable automated vent cover 3900. With reference to FIG. 10, a vent cover system 1 preferably includes the portable automated vent cover 3900 and the vacuum release door 10. With reference to FIGS. 1-6, the portable automated vent cover 3900 preferably includes a drive system 3910, a telescoping tube 3920, a vent cover door 3930 and a collapsible mobile tripod 3940. The drive system 3910 preferably includes a drive motor (3950), a gear box 3960, a drive housing 3970, an up-relay 3980 and a down-relay 3990. The up and down relays are preferably double pole/double throw relays. However, the drive system 3910 could be replaced with any suitable manual lift system (not shown), such as, but not limited to any pole that is manually adjusted for any length. The manual lift system may be locked to any appropriate height. The telescoping tube 3920 includes an outer support tube 4000, an inner cover tube 4010, a rack gear 4020 and a stop collar 4030. However, other types of extendable supports besides telescoping tube 3920 may also be used. The drive motor 3950 drives an input of the gear box 3960 and an output shaft 4040 is driven by an output of the gear box 3960. A pinion gear 4050 is retained on the output shaft 4040 and the rack gear 4020 is driven by through the pinion gear 4050. The gear box 3960 reduces the speed of the drive motor 3950. Small electric motor gear boxes are well known in the art and need not be explained in detail. The drive motor 3950 is preferably a DC motor, but other motors could also be used.

The drive housing 3970 includes a first housing half 4060 and a second housing half 4070. Each end of the output shaft 4040 is rotatably supported by the first and second housing halves. The first housing half 4060 includes a first tube slot 4080 and the second housing half 4070 includes a second tube slot 4090. The first and second tube slots are sized to receive an outer perimeter of the outer support tube 4000. The first and second housing halves are secured to the inner cover tube 4010 with a plurality of fasteners 4100. A drive system cover 4110 is attached to an outside perimeter of the first housing half 4060 with a plurality of fasteners 4120. The up and down relays are retained in the drive system cover 4110. An inlet hole 4130 is formed through a wall of the drive system cover 4110 to receive an inlet electrical connector 4140. The inlet electrical connector 4140 is attached to the drive system cover 4110 with at least two fasteners 4150. The inlet electrical connector 4140 is connected to the electronic controller or programmable logic circuit 315 with an electrical cable (not shown).

The inlet electrical connector 4140 includes a ground line 4142, a power supply line 4144 and a retract power line 4146. A switch opening 4170 is formed through a wall of the drive system cover 4110 to receive an up-down switch 4160. The up-down switch 4160 is an on-off-on switch. The up-down switch 4160 includes an off-pole 4162, a first on-pole 4164 and a second on-pole 4166. The off-pole 4162 of the up-down switch 4160 is connected to the power supply line 4144 of the inlet electrical connector 4140. A switch lever 4168 of the up-down switch 4160 is toggled to the first on-pole 4164 to raise the inner cover tube 4010.

The electrical power flowing through the first on-pole 4164 energizes the up-relay 3980, which sends electrical power to the drive motor 3950 through a first contact 3982 and provides a path to ground for the drive motor 3950 through a second contact 3984. The electrical power flowing through the first on-pole 4164 is connected in series with a reset fuse 4172, which prevents the motor 3950 from being damaged, when the vent cover door 3930 is forced against the vent opening 4355. The motor 3950 is preferably a permanent magnet DC motor. Electromagnetic braking is inherent in permanent magnet DC motors. The electromagnetic braking keeps the vent cover door 3930 in contact with the vent opening 4355. The switch lever 4168 is toggled to the second on-pole 4166 to lower inner cover tube 4010. The electrical power flowing through the second on-pole 4166 energizes the down-relay 3990, which sends electrical power to the drive motor 3950 through a first contact 3992 and provides a path to ground for the drive motor 3950 through a second contact 3994. The retract power line 4146 is connected to the second on-pole 4166. Electrical power supplied through the retract power line 4146 will also lower the inner cover tube 4010.

The vent cover door 3930 includes a cover plate 4180, a peripheral sealing ring 4190 and a tube flange 4200. The peripheral sealing ring 4190 is attached to a top of the cover plate 4180 and around a perimeter thereof. The peripheral sealing ring 4190 is preferably fabricated of rubber, a rubber like material or any other suitable material. The tube flange 4200 is attached to a bottom of the cover plate 4180. The tube flange 4200 includes a tube opening 4210, which is sized to receive the inner cover tube 4010. A tightening screw 4212 is used to secure the inner cover tube 4010 in the tube flange 4200. The rack gear 4020 is attached to the inner cover tube 4010 with a plurality of fasteners 4220. An end cap 4012 is preferably retained in a bottom of the inner cover tube 4010 with at least one fastener 4014. A rack slot 4230 is formed in the outer support tube 4000 to provide clearance for the rack gear 4020. The stop collar 4030 includes a clamp slot 4032, a tube opening 4034 and a stud slot 4036. A threaded stud 4240 is secured in the stud slot 4036 with a pair of nuts (not shown) secured to a top and bottom of the stop collar 4030. The threaded stud 4240 is positioned to actuate a normally closed limit switch 4250 to an open position to stop the flow of electricity to the down-relay 3990. The threaded stud 4240 is axially and radially adjusted to actuate a lever 4252 of the limit switch 4250 and stop the flow of electricity to the drive motor 3950, just before the down stop strikes a top of the drive housing 3970. A clamping fastener 4260 is tightened to secure the stop collar 4030 on the inner cover tube 4010.

Figure 1:
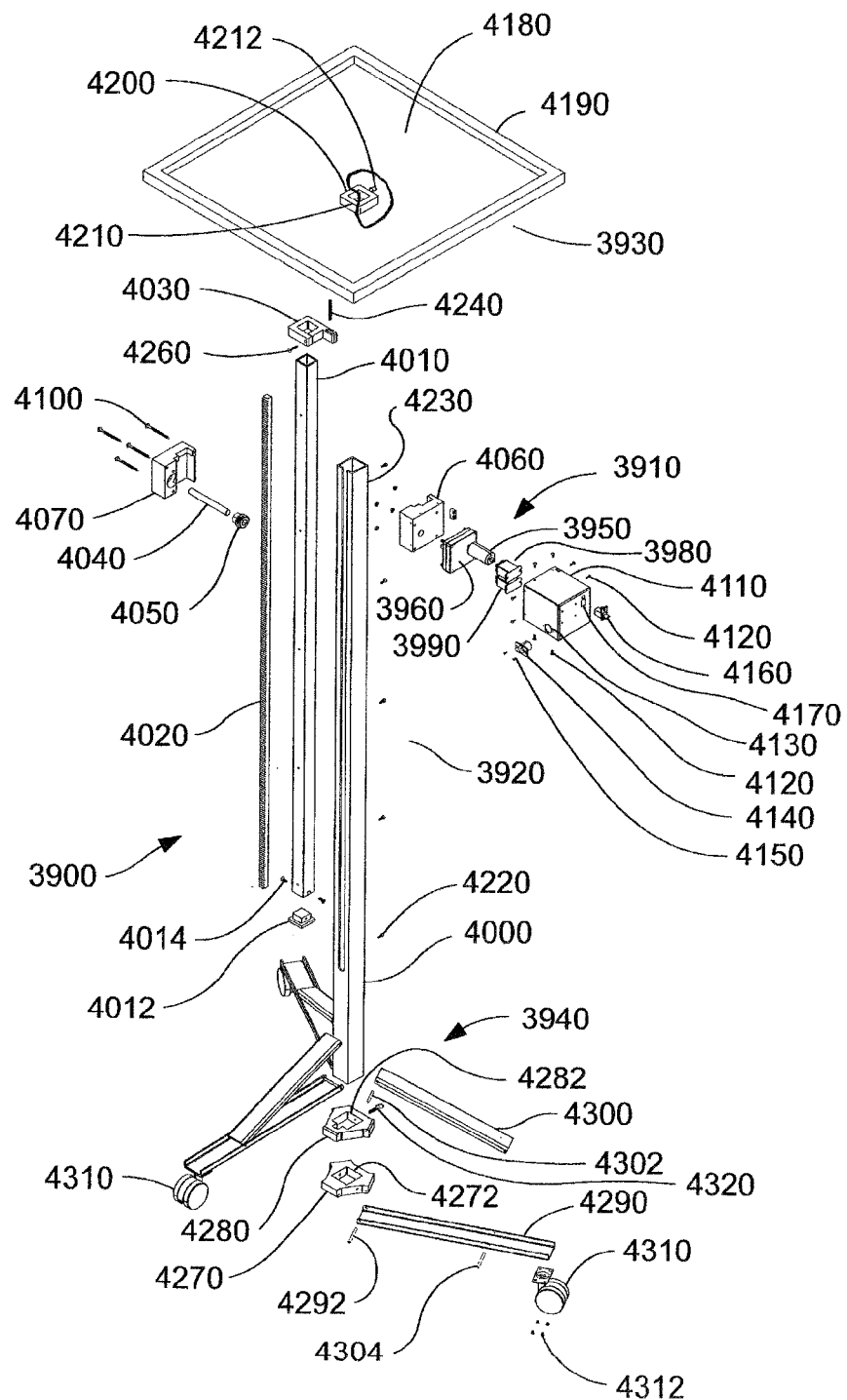
FIG. 1 is an exploded perspective view of a portable automated vent cover.
Figure 2:
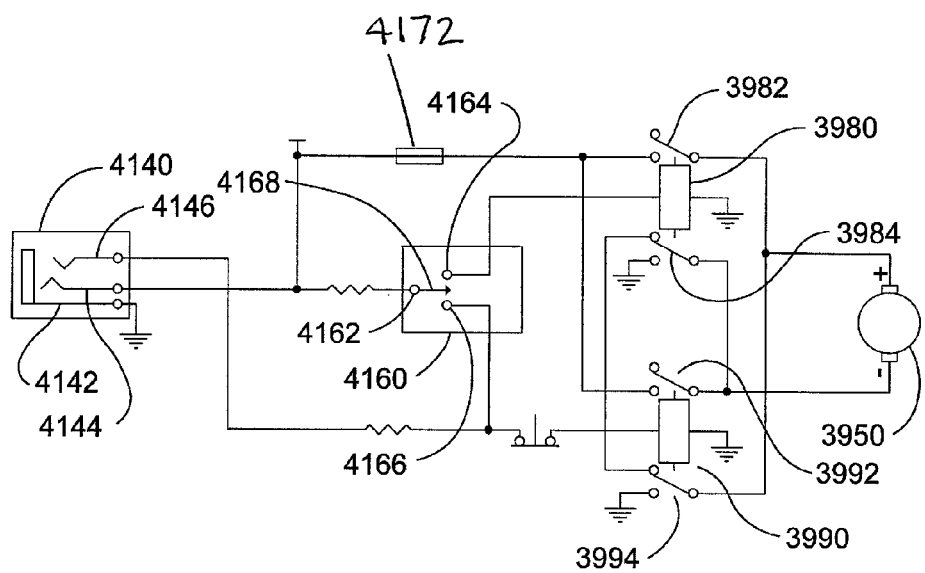
FIG. 2 is an electrical schematic of a portable automated vent cover.
Figure 3:
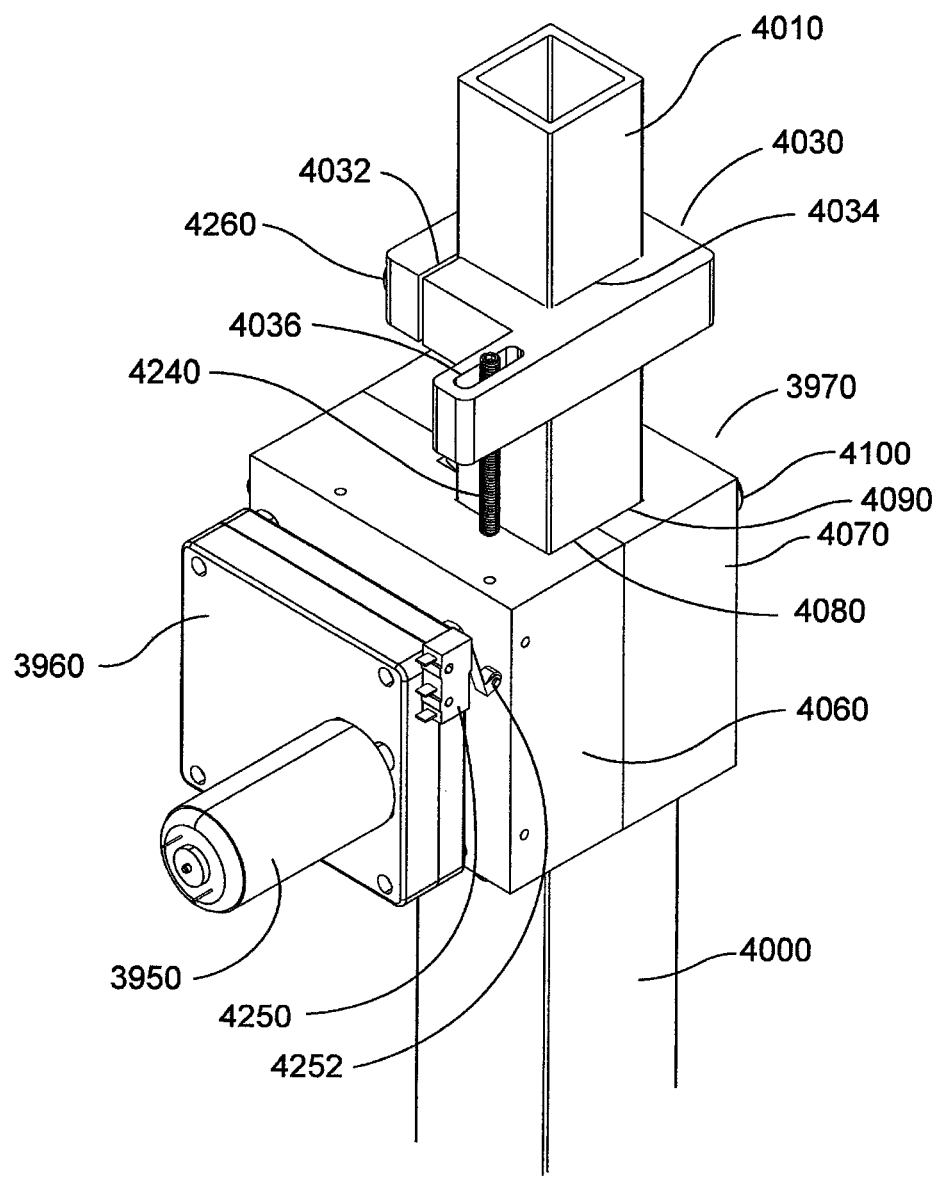
FIG. 3 is an enlarged perspective view of a drive system of a portable automated vent cover with a down stop in a raised position.
Figure 4:
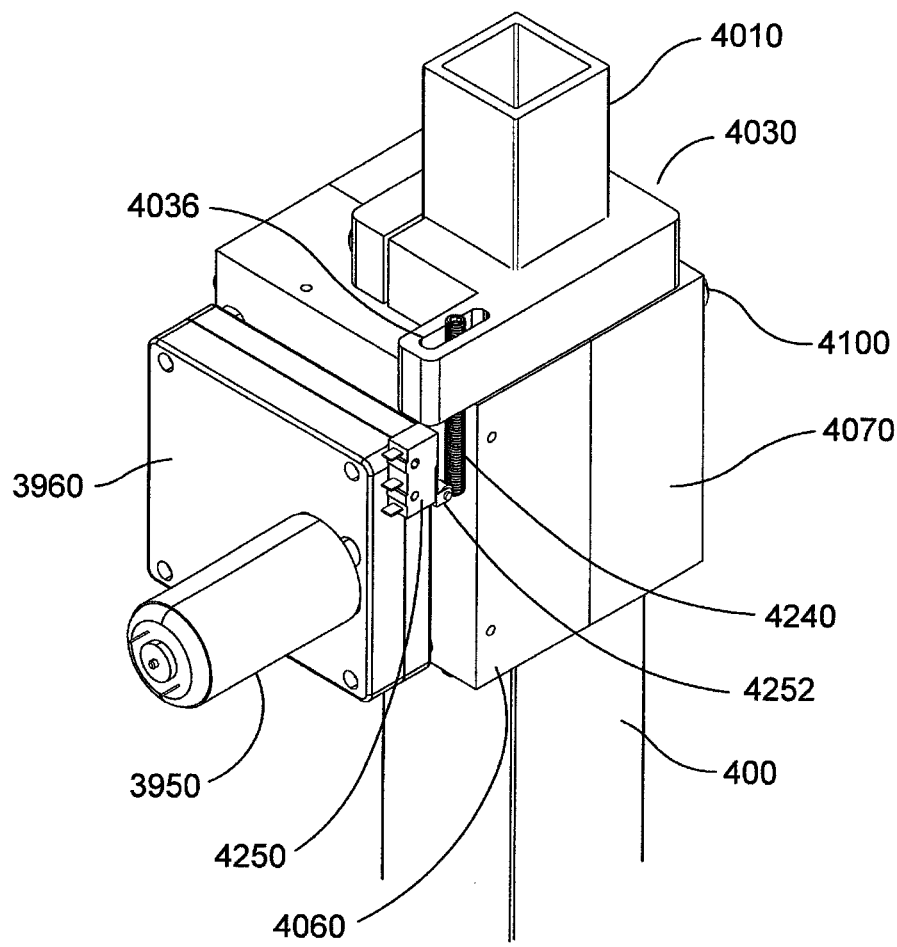
FIG. 4 is an enlarged perspective view of a drive system of a portable automated vent cover with a down stop in a lowered position.
Figure 5:
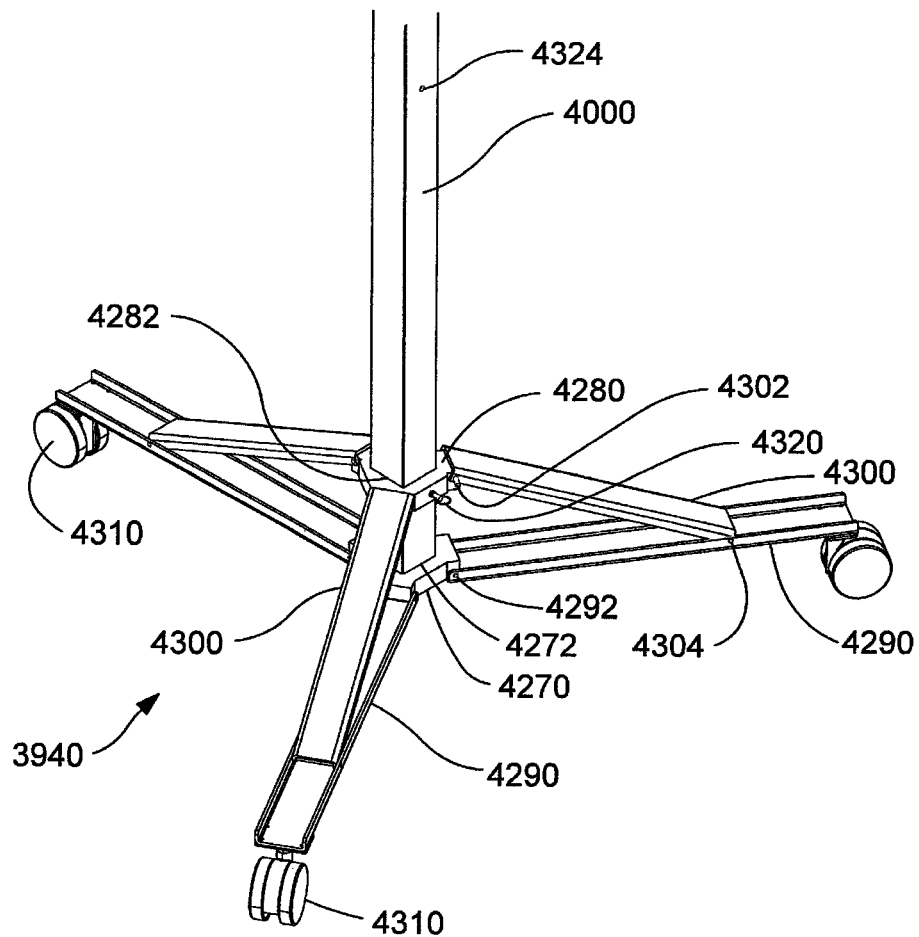
FIG. 5 is an enlarged perspective view of a mobile tripod of a portable automated vent cover.

With reference to FIGS. 5-6, the collapsible mobile tripod 3940 preferably includes a stationary pivot block 4270, a sliding pivot block 4280, three lower support arms 4290, three upper support arms 4300 and three castors 4310. The stationary pivot block 4270 includes a tube opening 4272, which is sized to receive the outer support tube 4000. The stationary pivot block 4270 is attached to a bottom of the outer support tube 4000 with any suitable device or method, such as fasteners. One end of the three lower support arms 4290 are pivotally attached equidistant around a perimeter of the stationary pivot block 4270 with three pivot pins 4292. The three castors 4310 are attached to a bottom of the other end of the three lower support arms 4290 with a plurality of fasteners 4312. The sliding pivot block 4280 includes a tube opening 4282, which is sized to slidably receive the outer support tube 4000.

One end of the three upper support arms 4300 are pivotally attached equidistant around a perimeter of the sliding block 4280 with three pivot pins 4302. The other end of the three upper support arms 4300 are pivotally attached to the three lower support arms with three pivot pins 4304. A locking pin 4320 is inserted through the sliding support block 4280 and a support hole 4322 or a retraction hole 4324 in the outer support tube 4000 to place the mobile tripod in a support orientation or a retracted orientation, respectively.

Figure 8:
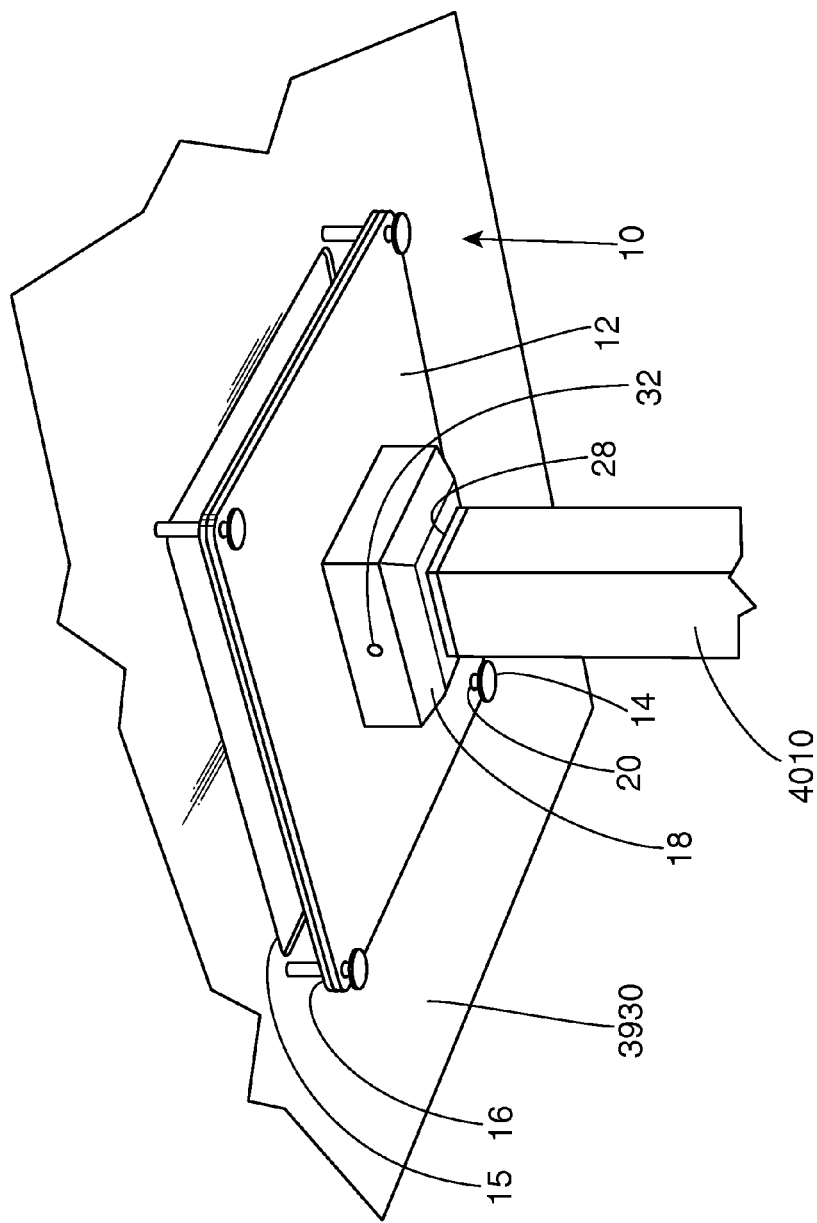
FIG. 8 is a bottom perspective view of a vacuum release door fully withdrawn from a vent cover door of a vent cover system in accordance with the present invention.
Figure 9:
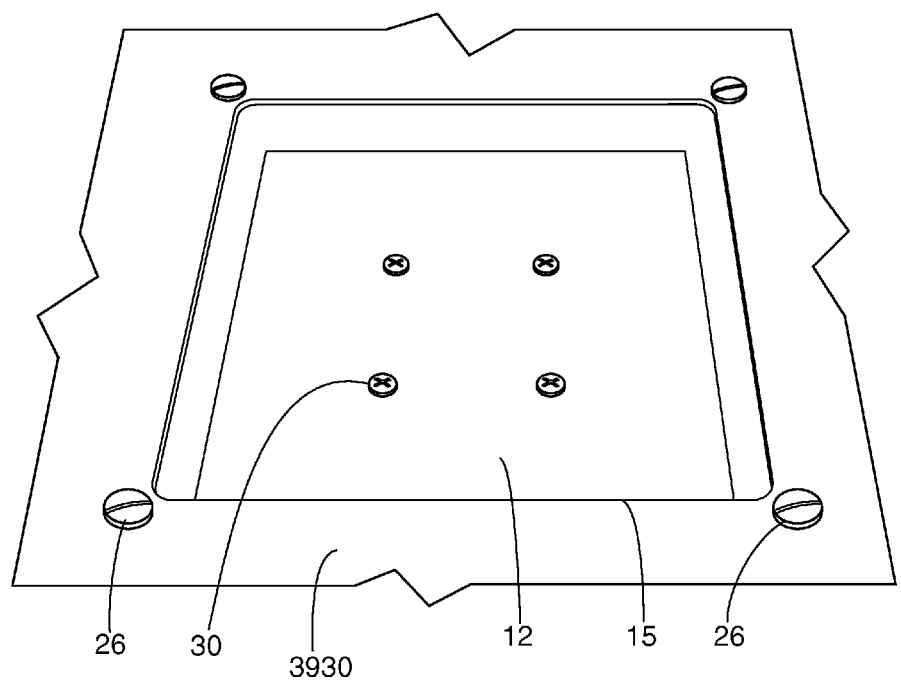
FIG. 9 is a top perspective view of a vacuum release door in contact with a vent cover door of a vent cover system in accordance with the present invention.

With reference to FIGS. 7-9, the vacuum release door 10 preferably includes a vacuum door plate 12, a plurality of retention pins 14, a sealing gasket 16 and a tube flange 18. The sealing gasket 16 preferably includes the same outer perimeter as the vacuum door plate 12. The sealing gasket 16 is preferably fabricated from rubber, a rubber like material, or any suitable material. A vacuum break opening 15 is formed through a center of the vent cover door 3930. The vacuum door plate 12 has an outer perimeter that is larger than a perimeter of the vacuum break opening 15. The sealing gasket 16 is attached to a top of the vacuum door plate 12. A plurality of pin holes 20 are formed around a perimeter of the vacuum door plate 12 to slidably receive the plurality of retention pins 14. Each retention pin 14 includes a head portion 22 and a pin portion 24. The pin portion 24 extends from the head portion 22. The pin portion 24 is inserted through the plurality of pin holes 20 and attached to the vent cover door 3930 with fasteners 26 or the like.

Alternatively, and without limitation, the pin portion 24 is inserted through the plurality of pin holes 20 and attached to the vent cover door 3930 and/or the cover plate 4180, with fasteners 26 or the like. The pins 24 may also be suitably terminated on both ends, so they can perform their intended purposes, while also be able to have axial movement in the pin holes 20. However, other devices may also be substituted for the plurality of retention pins 14, such as but not limited to any type of guide rails. The tube flange 18 includes a tube opening 28, which is sized to snugly receive a top end of the inner cover tube 4010. The tube flange 18 is attached to a bottom of the vacuum door plate with fasteners 30 or the like. The inner cover tube 4010 is retained in the tube flange 18 with a pin 32 or the like.

With reference to FIG. 10, a vent bypass system 34 is created in part by forming a bypass hole 36 through a vent cover door 3930a, 3930b of two adjacent vent cover systems 1. A tube flange 38a, 38b extends from a bottom surface of the vent cover door 3930a, 3930b, concentric with the bypass hole 36. The first vent cover door 3930a covers an entry vent 100 and the second vent cover door 3930b covers an exit vent 102. A first end of a flexible tube 40 is secured to the first tube flange 38a with a hose clamp 42 or the like, and a second end of the flexible tube 40 is secured to the second tube flange 38b. Air blown into a room 104 will bypass circulating through the room 104 by going through the flexible tube 40 from the entry vent 100 to the exit vent 102. The vent bypass system 34 will also keep a balance in a circulating system by not sealing up a normal flow pattern through the room. Additionally, more than one entry vent 100 may be transferred to one exit vent 102 with more than one tube 40, or one entry vent 100 may be transferred to more than one exit vent 102 with more than one tube 40.

In use, the vent cover door 3930 is raised, until a peripheral sealing ring 4190 on a top of the vent cover door 3930 seals around and/or to a perimeter of a vent opening (not shown). When an attempt is made to lower the vent cover door 3930 from the vent opening, retraction of the inner cover tube 4010 will cause a seal to be broken between the vacuum door plate 12 and the vacuum break opening 15 in the vent cover door 3930. After the seal is broken, the plurality of retention pins 14 will experience a downward force, which will cause a seal between the vent cover door 3930 and the vent opening to be broken. The vent cover system 1 makes it easier to break a seal between the vent opening and the vent cover door 3930, because the perimeter of the vacuum release door 12 is much shorter than a perimeter of the vent cover door 3930. An air gap between a bottom of the vent cover door 3930 and a top of the vacuum door plate 12 is preferably, and without limitation, at least ⅛ inch, when the vacuum door plate 12 is in an open position. The vacuum door plate 12 seals the vacuum break opening 15 in a closed orientation. The vacuum door plate 12 does not cover the vacuum break opening 15 in an open orientation. It is easier to break a small perimeter seal than a large perimeter seal. At least one weight 44 may be placed on top of the collapsible mobile tripod 3940 to ensure that the vacuum door plate 12 is opened when the vacuum door plate 12 is retracted. A proximity sensor may be mounted on the vent cover door 3930 to provide feedback to prevent the over progression or movement of the vent cover door 3930 relative to the vent 100, 102. The proximity sensor may be used to turn off the drive motor 3950, when the vent cover door 3930 contacts the vent 100, 102.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A vent cover system comprising:
  a vent cover door having a vacuum break opening formed therethrough, said vent cover door is capable of covering a vent opening, an outer perimeter of said vacuum break opening is substantially less than an outer perimeter of said vent cover door;
  a vacuum door plate having a perimeter that is larger than a perimeter of said vacuum break opening;
  a support device includes a base and an extendable support, said base is retained on a floor, one end of said extendable support includes a first end and a second end, said first end is retained in said base, said second end is attached to said vacuum door plate; and
  a retention device retaining said vacuum door plate against said vent cover door in a closed position, said retention device positioning said vacuum door plate away from said vent cover door in an open position.

2. The vent cover system of claim 1 wherein:
  said support device is a telescoping tube, said telescoping tube includes an outer support tube and an inner support tube, said inner support tube is slidably retained in said outer support tube.

3. The vent cover system of claim 2, further comprising:
  a tube flange includes a tube opening, said tube opening is sized to receive said inner cover tube, said tube flange is attached to a bottom of said vent cover door.

4. The vent cover system of claim 1 wherein:
  said support device is a tripod.

5. The vent cover system of claim 1 wherein:
  at least one weight is attached to said support device.

6. The vent cover system of claim 1 wherein:
  a plurality of retention pins for slidably retaining said vacuum door plate relative to said vacuum break opening.

7. The vent cover system of claim 1, further comprising:
  a gasket being retained between said vacuum door plate and said vent cover door.

8. A vent cover system comprising:
  a vent cover door having a vacuum break opening formed therethrough, said vent cover door capable of covering a vent opening, an outer perimeter of said vacuum break opening is substantially less than an outer perimeter of said vent cover door;
  a vacuum door plate having a perimeter that is larger than a perimeter of said vacuum break opening;
  a support device includes a base and an extendable support, said base is retained on a floor, one end of said extendable support includes a first end and a second end, said first end is retained in said base, said second end is attached to said vacuum door plate; and a lift system for elevating said extendable support relative to said base; and a retention device retaining said vacuum door plate against said vent cover door in a closed position, said retention device positioning said vacuum door plate away from said vent cover door in an open position.

9. The vent cover system of claim 8 wherein:

said support device is a telescoping tube, said telescoping tube includes an outer support tube and an inner support tube, said inner support tube is slidably retained in said outer support tube.

10. The vent cover system of claim 9, further comprising:

a tube flange includes a tube opening, said tube opening is sized to receive said inner cover tube, said tube flange is attached to a bottom of said vent cover door.

11. The vent cover system of claim 8 wherein:

said support device is a tripod.

12. The vent cover system of claim 8 wherein:

at least one weight is attached to said support device.

13. The vent cover system of claim 8 wherein:

said retention device includes a plurality of retention pins for slidably retaining said vacuum door plate relative to said vacuum break opening.

14. The vent cover system of claim 8, further comprising:

a gasket being retained between said vacuum door plate and said vent cover door.

15. A vent cover system comprising:

a vent cover door having a vacuum break opening formed therethrough, said vent cover door capable of covering a vent opening, an outer perimeter of said vacuum break opening is substantially less than an outer perimeter of said vent cover door;

a vacuum door plate having a perimeter that is larger than a perimeter of said vacuum break opening;

a support device includes a base and an extendable support, said base is retained on a floor, said extendable support includes a first end and a second end, said first end is retained in said base, said second end is attached to said vacuum door plate; and a retention device retaining said vacuum door plate against said vent cover door in a closed position, said retention device positioning said vacuum door plate away from said vent cover door in an open position, wherein said extendable support capable of separating said vacuum door plate from said vent cover door.

16. The vent cover system of claim 15 wherein:

said support device is a telescoping tube, said telescoping tube includes an outer support tube and an inner support tube, said inner support tube is slidably retained in said outer support tube.

17. The vent cover system of claim 16, further comprising:

a tube flange includes a tube opening, said tube opening is sized to receive said inner cover tube, said tube flange is attached to a bottom of said vent cover door.

18. The vent cover system of claim 15 wherein:

said support device is a tripod.

19. The vent cover system of claim 15 wherein:

at least one weight is attached to said support device.

20. The vent cover system of claim 15 wherein:

said retention device includes a plurality of retention pins for slidably retaining said vacuum door plate relative to said vacuum break opening.

\* \* \* \* \*